Jan. 19, 1932.     F. E. FARNHAM     1,841,885
PINSTEM
Filed April 1, 1930
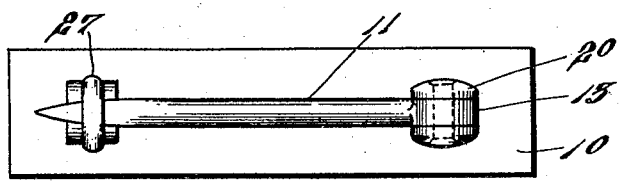
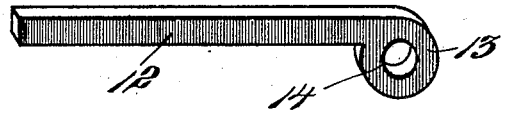
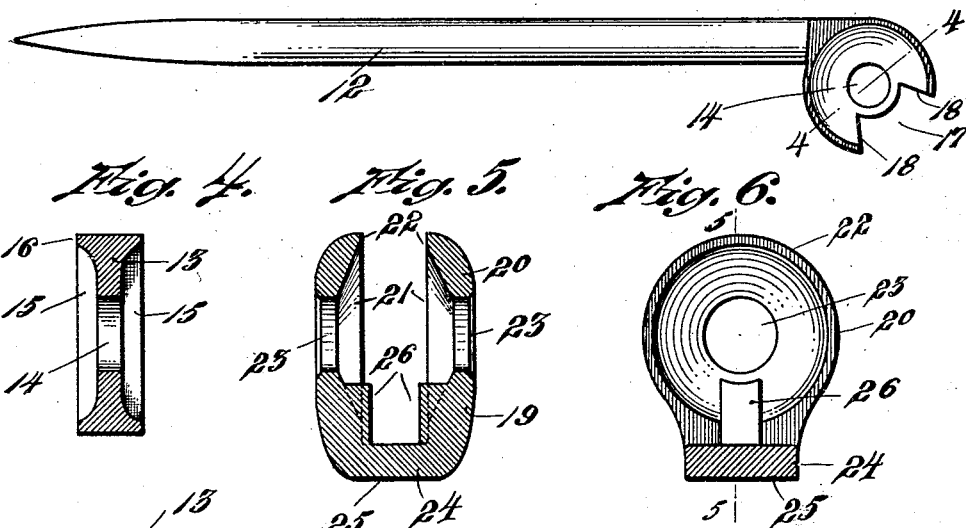
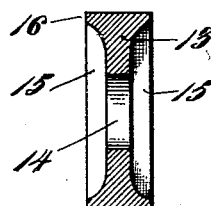
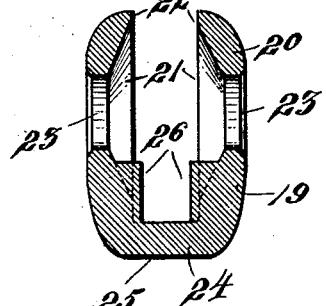
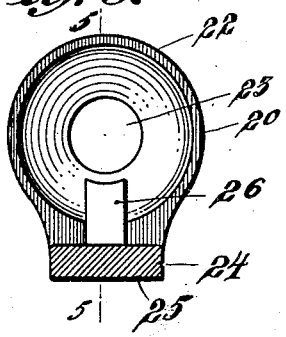
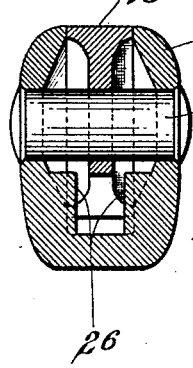
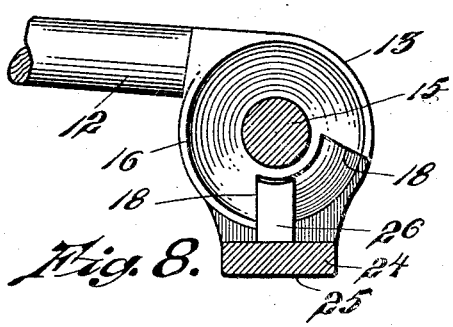
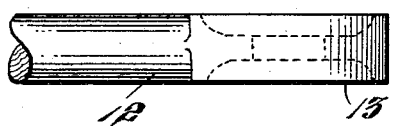
INVENTOR.
Frank E. Farnham
BY Barlow & Barlow
ATTORNEYS.

Patented Jan. 19, 1932

1,841,885

UNITED STATES PATENT OFFICE

FRANK E. FARNHAM, OF PROVIDENCE, RHODE ISLAND, ASSIGNOR TO THE JEWELERS SUPPLY COMPANY, OF PROVIDENCE, RHODE ISLAND, A CORPORATION OF MAINE

PINSTEM

Application filed April 1, 1930. Serial No. 440,686.

This invention relates to an improved construction of pinstem and pinstem joint; and has for its object to provide a pinstem member and a joint member, each with the minimum volume or weight of stock and at the same time retain the requisite strength in these members.

A further object of the invention is to provide a pinstem having a head with its side faces concaved to reduce the volume or weight of the pinstem and at the same time preserve the requisite peripheral bearing surface.

A still further object of the invention is to provide a peripheral opening in the head of this pinstem arranged to engage the fulcrum stop in the joint member to limit the throw of the pinstem in both directions.

The invention further consists in concaving the inner faces of the side walls of the joint member to reduce the volume of weight of this member and to also preserve a peripheral bearing surface for the head of the pinstem.

With these and other objects in view, the invention consists of certain novel features of construction, as will be more fully described, and particularly pointed out in the appended claims.

In the accompanying drawings:

Fig. 1 is a top view of my improved pinstem mounting;

Fig. 2 is a perspective view of a pinstem as blanked from sheet stock;

Fig. 3 is an enlarged view of a pinstem with the shank portion rounded and the side walls of the head portion concaved and provided with a peripheral stop-receiving opening.

Fig. 4 is an enlarged section on the line 4—4 of Fig. 3 thru the head, showing the side faces thereof as formed concaved;

Fig. 5 is a central sectional edge view of the joint member on the line 5—5 of Fig. 6;

Fig. 6 is a central sectional side view of the joint member;

Fig. 7 is a sectional edge view showing the head of the pinstem mounted in the joint;

Fig. 8 is a side view in section, showing the head of the pinstem mounting in the joint;

Fig. 9 shows the top of the head portion of the pinstem as being of a width substantially that of the shank portion.

It is found in the practical construction and operation of pinstem mountings, particularly where the mounting is formed of the more expensive precious metals, of advantage to reduce the volume or weight of these parts to the minimum, commensurate with their operating strength, thereby producing a structure of these precious metals which is strong and durable and of the minimum cost. It has also been found in practice of advantage to form pinstems from sheet stock and to subsequently round the shank portion thereof. In this way the head portion thus formed is of a thickness greater than is necessary for its strength, and in order to reduce the volume of this head and yet retain the outer or peripheral side wall bearing surface, I have struck or swaged and so concaved the side faces on either side thereof, and to further reduce the weight of this head, I have cut away a portion of the periphery forming a recess to receive a stop lug formed in the joint member, the end walls of the recess serving as abutments to engage this lug and so limit the swinging motion of the pinstem in both directions. It is also found of advantage in the construction of a pinstem joint to concave the inner faces of its side walls, in order to reduce the volume or weight thereof without reducing its strength and to provide stop lugs on this member to enter the opening in the head of the pinstem; and the following is a detailed description of the present embodiment of my invention and showing one construction of parts by which these advantageous results may be accomplished.

With reference to the drawings, 10 designates the base member to which my improved pinstem mounting is attached. The pinstem 11 is preferably formed of sheet stock, as illustrated in Fig. 2, having a shank portion 12 and a head portion 13. This shank portion is subsequently rounded, as best illustrated in Fig. 3, and pointed at its outer end, and the head portion 13 of the pinstem is preferably pierced as at 14, to receive the pivot pin 15. This head portion 13 being of the same thickness as that of the stem 12, is found to have more stock therein than is required for its strength and when formed of the expensive precious metals, it is found of advantage to reduce the volume of this stock in such a way as to still retain the required strength and the requisite extent of bearing surface; and to accomplish this in a simple and effective way, I have formed the side faces of this head member concaved as at 15, see Fig. 4, and at the same time have retained the side bearing surfaces 16 about the periphery thereof.

In order to further reduce the volume of the stock in this head portion, I have cut away the periphery of this head, as at 17, forming an opening with spaced end wall abutments 18.

The joint member 19 of this mounting when formed of precious metal may also be reduced in volume by concaving the inner surface of its side walls 20, as at 21, at the same time maintaining its peripheral bearing edges 22 which are arranged to engage the corresponding bearing surfaces 16 of the pinstem head. These side walls are centrally pierced as at 23 to receive the pivot pin 15 and are joined together by a bridge portion 24 providing a base 25 in which this member may be attached to the base plate 10 by solder or otherwise. On the inner surfaces of these side walls and projecting upwardly from the base thereof are stop lugs 26 extending inwardly beyond the plane of the inner bearing faces 22 to extend into the notch or opening 17 in the pinstem head to engage the walls 18 thereof and so limit the stroke of the pinstem in both directions, the forward wall 18 engaging these stop lugs in position to cause the pinstem to be under tension when sprung into the catch member 27 and the rear wall 18 serving to limit the opening or backward swing of the pinstem.

By the use of my improved pinstem joint and catch members, each may be made of the minimum volume or weight and yet be of the required strength, which reduction in weight is of importance when constructed of the expensive precious metals as they are thus permitted to render the requisite service and yet be marketed at the minimum price for goods constructed of this high quality of material.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A pinstem having a head and a shank portion, the side faces of the head portion being concaved inwardly from the periphery thereof to leave a marginal bearing surface.

2. A pinstem formed from sheet stock having head and shank portions both of substantially the same thickness, the shank portion being rounded and the side walls of the head portion being concaved inwardly from the periphery thereof to leave a marginal bearing surface.

3. A pinstem formed from sheet stock having head and shank portions both of substantially the same thickness, the shank portion being rounded and the side walls of the head portion being concaved, said head having a pivot pin opening and a peripheral opening with end walls to engage a fulcrum stop and limit the throw of the pinstem in both directions inwardly from the periphery thereof to leave a marginal bearing surface.

4. In a pinstem mounting, a joint member having side walls with concaved inner surfaces spaced inwardly from the periphery thereof leaving a relatively narrow marginal edge bearing portion.

5. In a pinstem mounting, a joint member having side walls with concave inner surfaces spaced inwardly from the periphery thereof leaving a relatively narrow marginal edge bearing portion, a pinstem pivotally mounted in said joint having the side faces of its head portion concaved inwardly from the peripheral edge thereof to leave a relatively narrow marginal bearing portion arranged to engage the bearing portion of the joint member.

6. In a pinstem mounting, a joint member having side walls with concaved inner surfaces spaced inwardly from the periphery thereof leaving a relatively narrow marginal edge bearing portion, stop means extending inwardly from one of said side walls, and a pinstem pivotally mounted in said joint member having a notch in its periphery to receive said stop in the joint member and having its sides engaging said marginal edge bearing portions.

7. In a pinstem mounting, a joint member having opposite side walls with concaved inner surfaces spaced inwardly from the periphery thereof, leaving marginal edge bearing portions, stops extending inwardly from each of the opposite side walls, and a pinstem pivotally mounted in said joint member having a notch in its periphery to receive said stops in the joint member and arranged to engage said marginal edge bearing portions.

In testimony whereof I affix my signature.

FRANK E. FARNHAM.